United States Patent
Yoon

(10) Patent No.: US 6,631,121 B1
(45) Date of Patent: *Oct. 7, 2003

(54) METHOD AND APPARATUS FOR MANAGING OVERHEAD CHANNEL IN MOBILE COMMUNICATION SYSTEM

(75) Inventor: Sung-Hoon Yoon, Seoul (KR)

(73) Assignee: Samsung Electronics Co., Ltd. (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,560

(22) Filed: Apr. 16, 1998

(30) Foreign Application Priority Data

Apr. 16, 1997 (KR) .......................... 1997-14002

(51) Int. Cl.[7] ............................................... H04B 7/216
(52) U.S. Cl. ..................... 370/329; 370/310; 370/335; 370/431; 370/441
(58) Field of Search ................. 370/310, 320, 370/329, 335, 342, 431, 441; 455/452, 453, 450

(56) References Cited

U.S. PATENT DOCUMENTS

| | | | | |
|---|---|---|---|---|
| 5,239,678 A | * | 8/1993 | Grube et al. ................. | 455/511 |
| 5,442,809 A | * | 8/1995 | Diaz et al. ................... | 455/511 |
| 5,457,680 A | * | 10/1995 | Kamm et al. ................ | 370/332 |
| 5,511,067 A | * | 4/1996 | Miller ......................... | 370/335 |
| 5,563,883 A | * | 10/1996 | Cheng ......................... | 370/449 |
| 5,615,255 A | * | 3/1997 | Lemieux ...................... | 379/230 |
| 5,621,723 A | * | 4/1997 | Walton et al. ............... | 370/335 |
| 5,710,972 A | * | 1/1998 | Lin .............................. | 455/525 |
| 5,722,043 A | * | 2/1998 | Rappaport et al. .......... | 455/452 |
| 5,734,646 A | * | 3/1998 | I et al. ........................ | 370/335 |
| 5,790,534 A | * | 8/1998 | Kokko et al. ................ | 370/335 |
| 5,796,722 A | * | 8/1998 | Kotzin et al. ................ | 370/252 |
| 5,799,254 A | * | 8/1998 | Karmi et al. ................ | 455/528 |
| 5,859,838 A | * | 1/1999 | Soliman ...................... | 370/249 |
| 5,886,988 A | * | 3/1999 | Yun et al. .................... | 370/329 |
| 5,930,706 A | * | 7/1999 | Raith .......................... | 455/422 |
| 5,937,353 A | * | 8/1999 | Fapojuwo .................... | 455/444 |
| 6,111,857 A | * | 8/2000 | Soliman et al. ............. | 370/254 |

* cited by examiner

Primary Examiner—Hassan Kizou
Assistant Examiner—Saba Tsegaye
(74) Attorney, Agent, or Firm—Dilworth & Barrese, LLP

(57) ABSTRACT

A method and apparatus for managing an overhead channel of a base station in a mobile communication system. The method begins with the step of calculating a load of the base station and determining a threshold value as a percentage of the calculated load. The system then monitors an actual load of the base station to determine if the load has reached the threshold value. If the load reaches the threshold value, an additional overhead channel assignment request message is transmitted to a channel card interface processor which assigns an additional overhead channel in response. If the load is subsequently lowered, an overhead channel assignment release request message is provided to the channel card interface processor which releases the additional overhead channel.

13 Claims, 2 Drawing Sheets

METHOD AND APPARATUS FOR MANAGING OVERHEAD CHANNEL IN MOBILE COMMUNICATION SYSTEM

BACKGROUND OF THE INVENTION

1. Field of the Invention

The present invention relates to a mobile communication system, and more particularly, to a method and apparatus for managing an overhead channel of a base station in order to improve and stabilize the performance of a code division multiple access (CDMA) system.

2. Description of the Related Art

In a current CDMA mobile communication system, an overhead channel operating in a channel card of a base station transceiver subsystem (BTS), for example, a pilot channel, a synchronizing channel, a paging channel or an access channel, is previously assigned and thus fixedly operated. When paging a mobile station through a forward CDMA channel, the BTS pages a corresponding terminal through a previously assigned paging channel of a specific number (for example, 1). In a reverse CDMA channel, a fixedly assigned access channel of a specific number (for example, 1) is used for a connection between the mobile station and the BTS.

However, such a paging method has several disadvantages, as described below. In the forward CDMA channel, even though there is no overload across the BTS when paging the mobile station whose current position is accurately known, the load of the BTS increases when paging the mobile station whose current position is not accurately known. The reason why problems arise when paging the mobile station whose current position is not accurately known will now be described.

When paging the mobile station whose current position is not accurately known, a primary paging operation is conducted in a cell by the BTS and a secondary paging operation is conducted in a zone consisting of several BTSs or by the unit of LAI (Location Area Identification). If the position of the mobile station is not accurately known even by the secondary paging operation, a tertiary paging signal is broadcast by the unit of MSC (Mobile Switching Center).

The overload associated with the location of a subscriber results in significant overhead traffic in the BTS and, in extreme cases, may bring the system down. Moreover, even in the reverse CDMA channel, a large quantity of traffic may be generated due to several factors including: an increase in origination performed through the access channel by the mobile station; responses to the paging of the BTS; and an increase in the number of registrations. As this overload is applied to the limited access channel, a connection between the mobile terminal and the BTS may become unstable.

SUMMARY OF THE INVENTION

It is an object of the present invention to provide a method and apparatus for managing an overhead channel of a BTS so as to improve and stabilize the performance of a mobile communication system.

It is another object of the present invention to provide a method and apparatus for determining the capacity of an overhead channel by previously predicting a load between a forward link and a reverse link.

It is still another object of the present invention to provide a method and apparatus for dynamically assigning radio resources by previously predicting an overload of an overhead channel which may be generated during an occurrence of urgent circumstances.

In accordance with one aspect of the present invention, a method for managing an overhead channel of a base station in a mobile communication system includes the steps of: calculating a load of the base station and assigning a threshold value based on said calculated load; monitoring the actual load of the base station; if the actual load reaches the threshold value, transmitting an additional overhead channel assignment request message to a channel card interface processor and additionally assigning the overhead channel; and if the actual load is lowered, transmitting an overhead channel assignment release request message to the channel card interface processor and releasing the overhead channel.

In accordance with another aspect of the present invention, an apparatus for managing an overhead channel of a base station in a mobile communication system includes: a load calculation processor for calculating a load of the base station; a storage unit for storing resources related to the additional assignment of the overhead channel on the basis of the calculated load; an overhead channel controller for transmitting, if the actual load reaches a threshold value, an additional overhead channel assignment request message to a channel card interface processor and assigning an additional overhead channel, and transmitting, if the actual load is lowered, an overhead channel assignment release request message to the channel card interface processor and releasing the overhead channel.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF PREFERRED EMBODIMENTS

In the following description, well-known functions or constructions which may obscure the invention are not described in detail.

The present invention calculates a maximum traffic which may be generated in the worst case in a forward channel in consideration of the probability of generating a mobile-to-mobile call, a mobile-to-land call, a land-to-mobile call and the number of bits of a message generated when a normal call is set up. If a load of a system approximates to a predetermined threshold value, paging channels are additionally assigned to process the load of the system. Further, in a reverse channel, access channels are added in consideration of the probability of generating a call and the volume of traffic generated when a normal call is set up. Therefore, the system anticipates an incipient overload condition which may be abruptly generated and dynamically allocates additional channel resources to prevent the overload.

Figure 1:
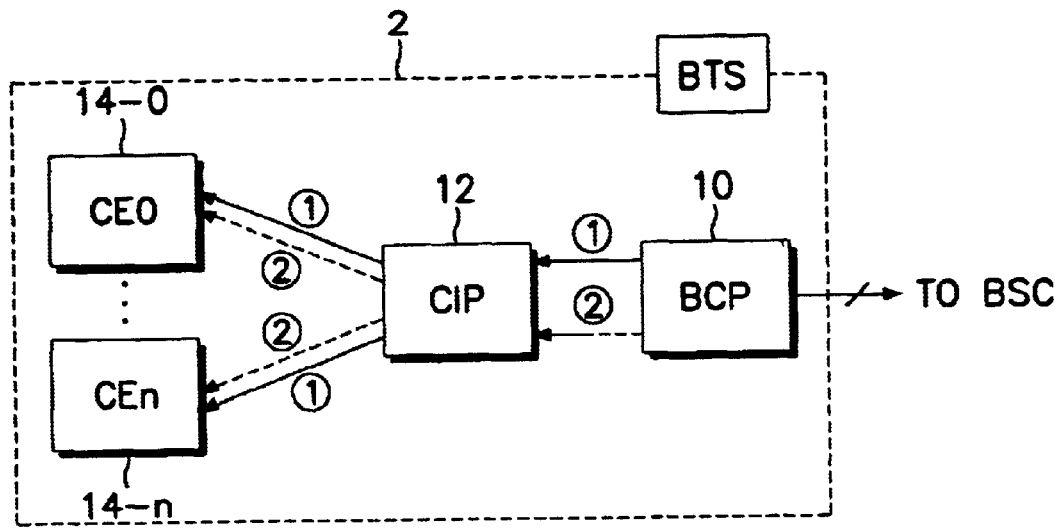
FIG. 1 is a block diagram of a base station transceiver subsystem (BTS)

Referring to FIG. 1, a base station transceiver subsystem (BTS) 2 connected to a base station controller (BSC) includes a BTS control processor (BCP) 10, a channel card interface processor (CIP) 12, and a plurality of channel elements (CE0, . . . CEn) 14-0, . . . 14-n. Within the BTS 2, assignment request messages and assignment release messages are processed. A signal flow indicated ① shows a transmission path for an additional assignment request message of an overhead channel, and ② shows a transmission path of an assignment release message of the overhead channel.

In mobile communication systems, which are subject to a fading phenomenon due to an abrupt variation of received signal strength, it is very important to consider a load between a forward link and a reverse link in order to effectively operate the system. In a preferred embodiment of the present invention, the capacity of the overhead channel which can maintain a balance between the load of the forward link and the load of the reverse link is derived as described below on the basis of IS-95, IS-95A, J-STD-008 and CAI specifications, which are air interface specifications.

(1) Forward CDMA Channel

Under the assumption that a normal call is set up, a load of total traffic is calculated by the BCP 10 on the basis of a message format of the air interface specifications IS-95, IS-95A and J-STD-008. If this load approximates to a threshold value, the BCP 10 transmits an additional overhead channel assignment request message of the CIP 12. In response to the assignment request message, the CIP 12 assigns one of the channel elements 14-0, . . . , 14-n as an additional paging channel.

The load in the forward channel is calculated by considering several factors. These factors will be illustrated in the following example, in the context of a message based on the specification IS-95. It is assumed that a message used in the forward CDMA channel is characterized as follows:

1. Overhead message: 752 bits

It is assumed that a mobile station does not include authentication data in an access channel message.

Number of neighbor lists is 16.

System parameter message: 264 bits

Access parameter message: 152 bits

Neighbor list message: 264 bits

CDMA channel list message: 72 bits
2. Channel assignment message: 136 bits
3. BS (Base Station) acknowledge order (BS_ACK_ORDER) message: 112 bits
4. Registration acknowledge order (REG_ACK_ORDER) message: 112 bits
5. Slotted page message: 240 bits It is assumed that 5 mobile stations are paged at 4800 bps at a time.
6. Number of channels per sector: N=20, 24, 28, 32
7. Average calling time: T=90 (sec)
8. Blocking probability B: B=2%
9. Offered load A represented by:

$$A = \frac{\text{Average Calling Time} \times \text{Total Subscribers} \times (BHCA / \text{Subscriber})}{\text{Hour}} \text{ [Erlang]} \quad (1)$$

10. Total Subscribers, M, given by:

$$M = \frac{A \times \text{Hour}}{\text{Average Calling Time} \times (BHCA / \text{Subscriber})} \quad (2)$$

11. Busy hour call attempts (BHCA) per subscriber: S=1.50
12. Number of calls setup per hour: CSH=M×S
13. General call occurrence form (and completion rate)

Mobile-to-mobile: 5% (50%)

Mobile-to-land: 65% (85%)

Land-to-mobile: 30% (50%)
14. Paging channel data rate: 9600 bps, 4800 bps
15. Paging channel processing performance: 90%
16. It is assumed that the number of registrations is 10. Where registration refers to a processing procedure performed by the mobile station to inform the BTS 2 of its position, a status, a slot cycle and other features.

On the basis of the above-described assumption, a total overhead message bit count, TOHMB, which can be generated in the forward CDMA channel by the overhead channel message per hour is represented by:

$$TOHMB = \frac{\text{Hour}}{Overhead.Msg.Period} \times Overhead.Msg \ Bit \quad (3)$$

where "Overhead.Msg.Period" is a transmission period of the overhead channel message, and "Overhead.Msg" is the number of bits in the overhead channel message.

A total channel assignment message bit count, TCAMB, which can be generated in the forward CDMA channel by a channel assignment message per hour is given by:

$$TCAMB = \frac{\text{Number of Call Setup}}{\text{Hour}} \times Ch.Assign.Msg \ Bit \quad (4)$$

where "Ch.Assign.Msg" is the number of bits in the channel assignment message.

A total registration acknowledge order message bit total, TRAOMB, which can be generated in the forward CDMA channel by a registration acknowledge order message per hour is expressed as:

$$TRAOMB = \text{Total Subscribers} \times \left( \frac{\text{Number of Registrations}}{\text{Subscriber}} \right)$$

$$\times Registration\_Ack\_Order\_Msg \ Bit \quad (5)$$

where "Registration_Ack_Order Msg" is the number of registration acknowledge order messages per hour.

A total base station (BS) acknowledge order message bit count, TBAOMB, which can be generated in the forward CDMA channel by a BS acknowledge order message per hour is given by:

$$TBAOMB = \left\{ \text{Total Subscribers} \times \frac{\text{Number of Regisrtation}}{\text{Subscriber}} + \frac{\text{Number of Call Setup}}{\text{Hour}} \right\} \times BS\_Ack\_Order\_Msg \ Bit \quad (6)$$

where "BS_Ack_Order_Msg" is the number of BS acknowledge order messages per hour.

A total page message bit TPMB which can be generated in the forward CDMA channel by a slotted page message per hour is represented by:

$$TPMB = \frac{\text{Number of Call Setup}}{\text{Hour}} \times (P_{MM} \times F_{MM} + P_{LM} \times F_{LM})$$

×Number of Sectors per Hour+Number of Call Setup/Hour

×($P_{MM}$×$P_{MME}$+$P_{LM}$×$P_{LME}$)

×Total Number of Sectors+Number of Call Setup/Hour

×($P_{MM}$×$P_{MME}$+$P_{LM}$×$P_{LME}$)×FGPE×SGP

×Slotted_Page_Msg Bit    (7)

where $P_{MM}$ is a mobile-to-mobile call occurrence probability, $P_{ML}$ is a mobile-to-land call occurrence probability, $P_{LM}$ is a land-to mobile call occurrence probability, $P_{MME}$ is a mobile-to-mobile call error probability, $P_{LME}$ is a land-to mobile call error probability, $F_{MM}$ is a factor required for the setup of 100% of a mobile-to-mobile call, $F_{LM}$ is a factor required for the setup of 100% of a land-to-mobile call, FGPE is a first group paging error, SGP is the number of sectors when a second group is paged, and Slotted_Page_Msg is the number of slotted page messages per hour.

The total bits per hour, TBPH, which can be generated in the forward CDMA channel per hour in consideration of the above equations (3), (4), (5), (6) and (7) is as follows:

TBPH=Overhead_Msg Bit+Ch_Assign_Msg Bit
+Reg_Ack_Order_Msg Bit
+BS_Ack_Order_Msg Bit
+Slotted_Page_Msg Bit; or

TBPH=TOHMB+TCAMB+TRAOMB+TBAOMB+TPMB    (8)

A paging channel load PCH_LOAD according to a paging channel data rate PCH_Data_Rate (9600 bps, 4800 bps) in the forward CDMA channel is given by:

$$PCHLOAD\ (\%) = \left[\frac{TBPH}{PCH.\text{Data.Rate} \times \text{Hour} \times PCH.\text{pro.proformance}}\right] \times 100 \quad (9)$$

where "PCH.pro.performance" is a paging channel processing performance.

(2) Reverse CDMA Channel

When a normal call is set up, a message is generated in the reverse CDMA channel which includes an origination message used for origination, a page response message used to respond to paging from the BTS, and a registration message used for registration. An access channel data rate is generally 4800 bps. For the following example, it is assumed that the average calling time is 90 seconds, an access channel processing performance is 80%, and the number of registration requests per subscriber is 10. All the access channels relate to a specific paging channel that has the same slot size.

Before a terminal transmits the message to the BTS, the start and length of the access channel are determined. An access channel slot consists of an access channel preamble and an access channel message capsule. That is, the access channel slot is (3+MAX_CAP_SZ)+(1+PAM_SZ), where MAX_CAP_SZ is a maximum access channel capsule size and PAM_SZ is an access channel preamble size. It is assumed that the access channel preamble size is 4 and the capsule size is 1, resulting in an access channel slot having 9 frames. For a standard frame period of 20 ms, the access channel slot size is 180 ms.

On the basis of the above assumption, a load ORLD which can be generated in the reverse CDMA channel by the origination message per hour is given by:

$$ORLD = \left[\frac{\text{Number of Call Setup}}{\text{Hour}} \times P_{ML} \times F_{ML}\right] + \left[\frac{\text{Number of Call Setup}}{\text{Hour}} \times P_{MM} \times F_{MM}\right] \quad (10)$$

A load PRLD which can be generated in the reverse CDMA channel by the page response message per hour is calculated by:

$$PRLD = \left[\frac{\text{Number of Call Setup}}{\text{Hour}} \times P_{MM} \times F_{MM}\right] + \left[\frac{\text{Number of Call Setup}}{\text{Hour}} \times P_{LM} \times F_{LM}\right] \quad (11)$$

A load RQLD which can be generated in the reverse channel by the registration request message per hour is expressed as:

RQLD=Number of Subscribers×Number of Registration×$F_{ML}$    (12)

In consideration of the above equations (10), (11) and (12), a total load TLOAD which can be generated in the reverse CDMA channel per hour is as follows:

TLOAD=ORLD+PRLD+RQLD    (13)

An access channel load ACH_LOAD(%) in the reverse CDMA channel is then obtained by:

$$ACH\_LOAD\ (\%) = \left[\frac{TLOAD}{(\text{Hour}/\text{Slot\_Size}) \times ACH\_\text{pro\_performance}}\right] \times 100 \quad (14)$$

The results from analyzing the traffic of an exemplary forward CDMA channel are listed below in Table 1, which shows loads according to the paging channel data rate when it is assumed that a normal call is performed on the basis of the IS-95 message format.

TABLE 1

| N | A | Total Page Bits | CH. Assign Bits | Reg. Ack. Bits | BS Ack. Bits | Over-head Bits | Slotted Page Bits | LD4800 (%) | LD9600 (%) |
|---|---|---|---|---|---|---|---|---|---|
| 20 | 13.2 | 27997.2 | 71808 | 394240 | 453376 | 2115000 | 6719328 | 62.7 | 31.4 |
| 24 | 16.6 | 35208.6 | 90304 | 495787 | 570155 | 2115000 | 8450064 | 75.4 | 37.7 |

TABLE 1-continued

| N | A | Total Page Bits | CH. Assign Bits | Reg. Ack. Bits | BS Ack. Bits | Over- head Bits | Slotted Page Bits | LD4800 (%) | LD9600 (%) |
|---|---|---|---|---|---|---|---|---|---|
| 28 | 20.2 | 42844.2 | 109888 | 603307 | 693803 | 2115000 | 10282608 | 88.8 | 44.4 |
| 32 | 23.7 | 50267.7 | 128928 | 707840 | 814016 | 2115000 | 12064248 | 101.8 | 50.9 |

In Table 1, N is the number of traffic channels and A is the offered load. The total page bits, channel assignment bits, registration acknowledge bits, BS Acknowledge bits, overhead bits and slotted page bits are bits which are generated with each message. LD4800(%) is the load of the paging channel data rate of 4800 bps and LD9600(%) is the load of the paging channel data rate of 9600 bps.

Figure 2:
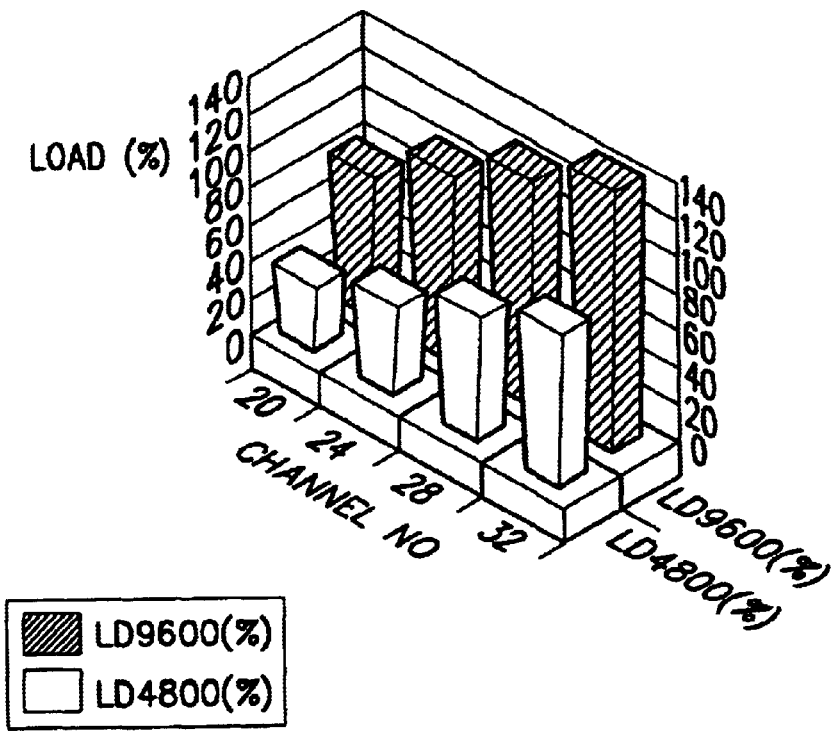
FIG. 2 is a diagram showing loads of a paging channel of a forward traffic according to a preferred embodiment of the present invention.

FIG. 2 illustrates the loads of the paging channel according to data shown in Table 1. The results shown in Table 1 and FIG. 2 are based on the IS-95 message format and consider both the primary paging and secondary paging operations.

In a general CDMA system, the primary paging is performed in a cell by the BTS 2. An unreasonable mobile subscriber, i.e., one whose position is not accurately known, requires additional paging operations. A mobile which fails in the primary paging is paged by the unit of LAI. When paging the unreasonable mobile subscriber, 279 sectors are paged in consideration of the BTS which is in the boundary of one MSC. For the secondary paging, 10 BTSs, that is, 30 sectors are paged in consideration of the BTSs connected to one BSC. When considering the primary paging and the secondary paging, if the paging channel data rate is 4800 bps (LD4800) and if the number N of the traffic channels is 28, the load exceeds 88.8%. If the number N of the traffic channels is 32, the load exceeds 100%.

If the BTS 2 detects that an actual operating load reaches a threshold value (80–85% of the calculated load), the BCP 10 transmits a paging channel assignment message to the CIP 12 as indicated by ①. If the total actual load is lowered to the threshold value or less, the BCP 10 transmits a paging channel assignment release message to the CIP 12 as indicated by ② to release the assigned overhead channel. Thus the load is decentralized and the system is stably operated.

The results from analyzing the traffic of an exemplary reverse CDMA channel is listed in Table 2, which shows loads according to the access channel data rate when it is assumed that a normal call is performed on the basis of the IS-95 message format.

TABLE 2

| N | A | M | CHS | Orig. | Page Resp. | Reg. Request | Total | Access Load (%) |
|---|---|---|---|---|---|---|---|---|
| 20 | 13.2 | 352 | 528 | 434.28 | 277.2 | 4048 | 4759.5 | 29.7 |
| 24 | 16.6 | 443 | 664 | 546.14 | 348.6 | 5091 | 5985.4 | 37.4 |
| 28 | 20.2 | 539 | 808 | 664.58 | 424.2 | 6195 | 7283.4 | 45.5 |
| 32 | 23.7 | 632 | 948 | 779.73 | 497.7 | 7268 | 8545.4 | 53.4 |

In the above Table 2, N is the number of traffic channels, A is the offered load, M is the total number of subscribers, CHS is the number of calls setup per hour, Orig. is the number of bits generated by the origination message, Page Resp. is the number of bits generated by the page response message, Reg. Request is the number of bits generated by the registration request message, and Total is the total number of bits which can be generated in the reverse channel per hour.

Figure 3:
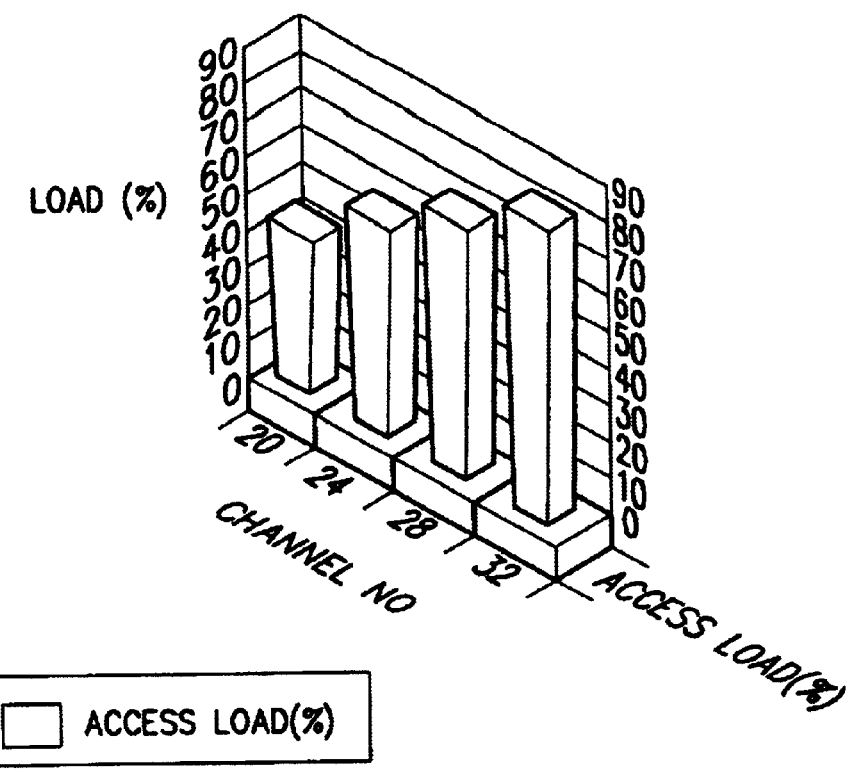
FIG. 3 is a diagram showing loads of an access channel of a reverse traffic according to a preferred embodiment of the present invention.

FIG. 3 illustrates the loads of the access channel according to data shown in Table 2. The results indicated in Table 2 and FIG. 3 are based on the IS-95 message format. In the reverse CDMA channel, if the access channel load approximates to the threshold value, the BCP 10 transmits an access channel assignment message (①) and an access channel release message (②) to the CIP 12. Preferably, the threshold value is 80–85% of the calculated load.

Figure 4:
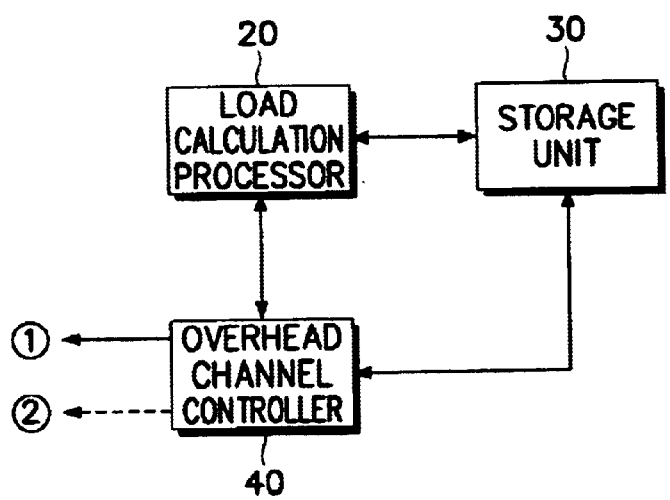
FIG. 4 is a functional block diagram of an overhead channel managing apparatus according to a preferred embodiment of the present invention.

FIG. 4 illustrates an overhead channel managing apparatus in the BCP 10 shown in FIG. 1. The overhead channel managing apparatus includes a load calculation processor 20, a storage unit 30 and an overhead channel controller 40. The load calculation processor 20 calculates the load across the BTS. The storage unit 30 stores resources related to the additional overhead channel assignment on the basis of the load calculated from the load calculation processor 20. The overhead channel controller 40 controls the overhead channel. For example, the overhead channel controller 40 recognizes and releases the additionally assigned overhead channel when the load is reduced.

In more detail, if the actual load of the BTS 2 approximates to the threshold value (80–85% of the calculated load), the overhead channel controller 40 of the BCP 10 transmits an assignment message (①) of the overhead channel (paging channel and access channel) to the channel elements 14-0, . . . , 14-n through the CIP 12. If the load of the BTS 2 is lowered to the threshold value or less, the overhead channel controller 40 of the BCP 10 transmits an assignment release message (②) of the overhead channel to the channel elements 14-0, . . . , 14-n through the CIP 12.

As noted previously, if the overload is applied to the system due to an increase in the traffic, the overhead channel (a paging channel, an access channel and the like) is assigned. If the load is normal, the assignment of the overhead channel is released. Therefore, the radio resources are effectively managed and the stability of the system is improved.

While there has been illustrated and described what is considered to be a preferred embodiment of the present invention, it will be understood by those skilled in the art that various changes and modifications may be made and equivalents may be substituted for elements thereof without departing from the scope of the invention as defined by the appended claims.

What is claimed is:

1. A method for managing an overhead channel of a base station in a mobile communication system, comprising the steps of:

calculating a load of said base station based upon a number of bits generated with each message and a channel data rate;

assigning a threshold value based on said calculated load;

monitoring an actual load of said base station;

if said actual load reaches said threshold value, assigning an additional overhead channel; and if said actual load is lowered below said threshold value, releasing said overhead channel.

2. The method as claimed in claim 1 wherein:

said assigning step further includes the step of transmitting an additional overhead channel assignment request message to a channel card interface processor; and said releasing step further includes the step of transmitting an overhead channel assignment release request message to said channel card interface processor.

3. The method as claimed in claim 1, wherein said threshold value is about 80–85% of the calculated load.

4. The method as claimed in claim 1, wherein said overhead channel is at least one of a paging channel and an access channel.

5. The method as claimed in claim 1, wherein the mobile communication system is a CDMA system having a forward CDMA channel and a reverse CDMA channel, said overhead channel being a paging channel in the forward CDMA channel and said overhead channel being an access channel in the reverse CDMA channel.

6. A system for managing an overhead channel of a base station in a mobile communication system, comprising:

means for calculating a load of said base station based upon a number of bits generated in each message and a channel data rate, and a threshold value based on said calculated load;

means for monitoring an actual load of said base station;

means for comparing said actual load to said threshold value;

means for assigning an additional overhead channel when said actual load is at least equal to said threshold value; and means for releasing said additional overhead channel when said actual load is less than said threshold value.

7. The system as claimed in claim 6, wherein said calculating means assigns said threshold value in a range of about 80–85% of a said calculated load.

8. The system as claimed in claim 6, wherein said overhead channel is at least one of a paging channel and an access channel.

9. The system as claimed in claim 6, wherein the mobile communication system is a CDMA system having a forward CDMA channel and a reverse CDMA channel, said overhead channel being a paging channel in the forward CDMA channel and said overhead channel being an access channel in the reverse CDMA channel.

10. An apparatus for managing an overhead channel of a base station in a mobile communication system, comprising:

a calculation processor for calculating a load of said base station based upon a number of bits generated in each message and a channel data rate, and assigning a threshold value based on said calculated load;

a storage unit for storing resources related to the additional assignment of said overhead channel on the basis of the calculated load;

a channel card interface processor, said channel card interface processor assigning an additional overhead channel in response to a received overhead channel assignment request message and releasing said overhead channel in response to a received overhead channel assignment release request message; and an overhead channel controller operatively coupled to said channel card interface processor, said overhead channel controller transmitting said additional overhead channel assignment request message if an actual load reaches said threshold value and transmitting said overhead channel assignment release request message if the actual load is lowered below said threshold value.

11. The apparatus as claimed in claim 10, wherein said threshold value is about 80–85% of said calculated load.

12. The apparatus as claimed in claim 10, wherein said overhead channel is at least one of a paging channel and an access channel.

13. The apparatus as claimed in claim 10, wherein the mobile communication system is a CDMA system having a forward CDMA channel and a reverse CDMA channel, said overhead channel being a paging channel in the forward CDMA channel and said overhead channel being an access channel in the reverse CDMA channel.

* * * * *